T. HEDGES.
MOTOR VEHICLE.
APPLICATION FILED OCT. 19, 1914.
1,135,938.
Patented Apr. 13, 1915.
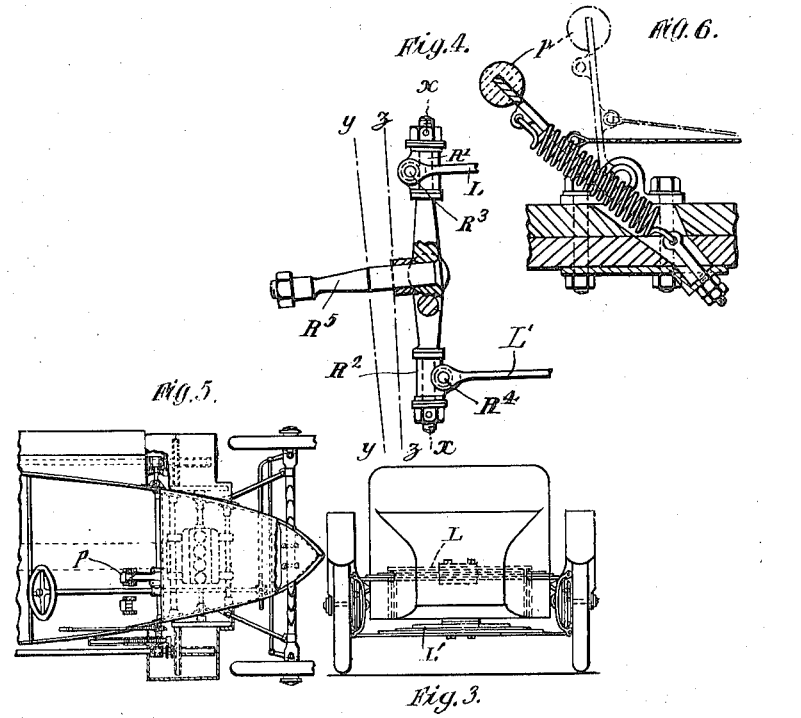
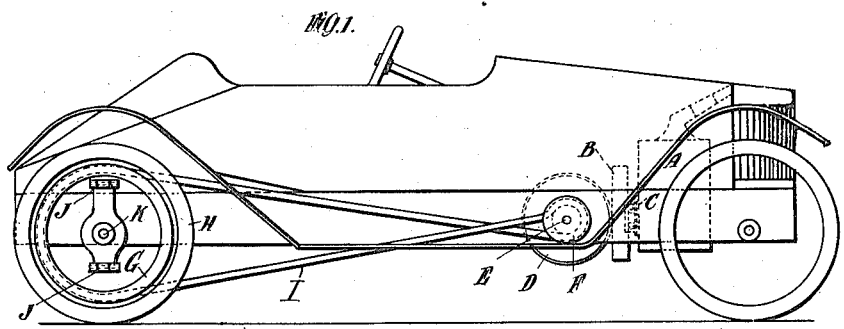
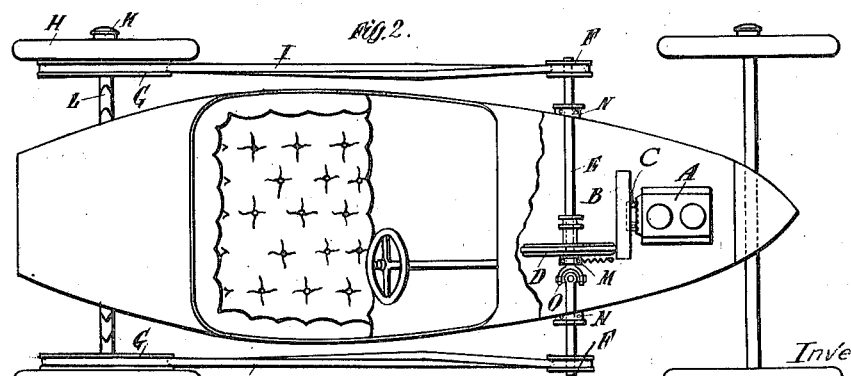
Witnesses:
Inventor:
Thomas Hedges
By Edson Bros.
Attorneys

UNITED STATES PATENT OFFICE.

THOMAS HEDGES, OF PALMERS GREEN, ENGLAND.

MOTOR-VEHICLE.

1,135,938.　　　　Specification of Letters Patent.　　Patented Apr. 13, 1915.

Application filed October 19, 1914. Serial No. 867,506.

*To all whom it may concern:*

Be it known that I, THOMAS HEDGES, a subject of the King of Great Britain, residing at 70 Bowes road, Palmers Green, in the county of Middlesex, England, have invented certain new and useful Improvements in or Relating to Motor-Vehicles, of which the following is a specification.

This invention has reference to motor vehicles and has for its object certain improvements in the construction and arrangement of the driving and transmission mechanism and the springing of the vehicle designed to produce an efficient and easy running car at a low cost.

The object of this invention is to provide a motor vehicle having in combination a pair of leaf-springs set transversely to and at the rear of the vehicle, one element of the pair being vertically above the other, supports for the stub axle held between the ends of the spring, one on each side of the vehicle, extending from driving gear situated forward of the rear wheels back into proximity to the stub-axle supports to drive the rear road wheels, said driving gear comprising a countershaft and a friction disk driving said countershaft.

The invention includes a transversely arranged countershaft carrying a friction disk mounted in free bearings, the inner one of which is movable longitudinally of the vehicle for the purpose of shifting the said friction disk into or out of contact with the fly wheel or driving disk, said countershaft being also provided with a flexible or universal joint or coupling alongside of or adjacent to said movable inner bearing to allow of this movement of the friction disk. On each end of the countershaft is a pulley transmitting through transmission devices the drive of the engine to pulleys fixed to each of the rear wheels.

In the accompanying drawings:—Figure 1 is a side elevation of a car embodying the invention. Fig. 2 is a plan of the same having part of the upper structure broken away at the front for the sake of clearness. Fig. 3 is a rear elevation of the car. Fig. 4 is a front elevation of a support for one of the steering wheels. Fig. 5 a plan view of the front portion of a car provided with a propeller shaft on each side driven by friction disks and showing a foot pedal to operate the friction clutch. Fig. 6 is a central vertical section on a larger scale of one of the pedals shown in Fig. 5.

The main frame of the vehicle conveniently comprises two girder-like side members which may be of wood or other material and solid or latticed according to convenience, and are curved round to the shape required for the sides of the vehicle, the members meeting at the front so that wind resistance is decreased and connected at the back by a suitable transverse member. These girder-members constitute part of the body as the floor is conveniently set at the bottom of the same and the superstructure of the body is built up upon them. The frame-members are carried upon the road-wheels H by a pair of transverse leaf-springs at the front, and a second pair at the back. The springs L, L' at the back are set one vertically over the other.

The springs L, L' carry between them vertical members R, Fig. 4. Each of these members is pivoted in sockets R', $R^2$, which are hinged to pins $R^3$, $R^4$ secured in the springs L and L' respectively. Each spring is jawed and the ends of the jaw are formed to constitute eyes in which the pin $R^3$ or $R^4$ is secured. The jaw of the spring L is made sufficiently deep to embrace the socket R' so that the pin $R^3$ can be passed through the eyes in the jaw and an eye in the socket on that side which faces downward away from the vehicle, but the lower spring L' is hinged by its pin $R^4$ to an eye placed on the vehicle side of the socket $R^2$; it will be appreciated that the spring L is thus somewhat longer than the spring L'. This is to give the requisite rake to the member R so that the axis $x$—$x$ through the steering member H may approximately meet the axis $y$—$y$ of the road-wheel at the point of contact with the ground without all the rake being on the one member K, the line $z$—$z$ indicating the vertical through the point of contact of the wheel with the ground. The member R has welded in it a stub-axle $H^5$ which carries the road-wheel.

Figs. 1 and 2 show the engine A (mounted with its crank shaft arranged longitudinally of the vehicle) has a fly-wheel or driving disk B on its rear end with suitable thrust washers or bearings C to give said disk the necessary support.

A friction disk D is mounted upon a transversely arranged sided, splined or feathered countershaft E in such a way that it can be moved along said shaft in the usual manner in order to obtain the various change of gearing and reversing effect. The outer ends of this countershaft carry pulleys F whence motion is imparted to a pulley or belt rim G fixed to each back wheel H through a separate pair of driving belts I. These latter pulleys G revolve in a plane coinciding with the plane in which work the pivotal connections J between the spindles or stub axles K on which the wheels H revolve and a pair of transverse flat superimposed horizontal springs L upon which they are mounted.

The friction-disk carrying countershaft E is mounted in three bearings M, N, N, the inner one M being movable longitudinally of the vehicle for the purpose of shifting the driven friction disk D into or out of contact with the fly-wheel or driving disk B. For this purpose said bearing M may either be pivotally supported or be arranged to slide in guides.

A flexible or universal joint or coupling O is provided in said countershaft alongside or adjacent to this movable inner bearing M to allow of this movement of the friction disk the bearings N at or near the outer ends of the countershaft being of the self alining type to allow of such movement.

The foot or hand lever P (Figs. 5 and 6) used for operating the inner bearing to throw the mechanism in or out of gear is arranged so as to put a certain amount of spring pressure upon the disk in the one position yet hold it firmly out of gear in the other position by any suitable means or if preferred the driving disk or fly wheel B may be constructed in any well known manner to provide a "neutral" position.

The belts I are crossed between the pulleys F and G as shown in Fig. 2 thus with a right hand or clockwise running engine bringing the sliding or movable bearing M nearer to the operating pedal.

With the above described construction of transmission gear for motor vehicles power is imparted direct to both back wheels from the countershaft E and moreover the pressure of the driven disk D against the driving disk B is automatically increased when in the lower gears owing to the increased leverage exerted by the shaft E as the said disk D is moved farther away from the bearing M toward the lower gear positions *i. e.* toward the center of the flywheel or driving disk B. This pressure is with the above described arrangement still further automatically augmented by the pull of the driving belts on the ends of the shaft tending to press the friction disk against the flywheel thus the greater the load or the power required to rotate the road wheels the greater will be the pressure due to that cause.

By crossing the belts I an improved driving effect is obtained owing to the increased grip of the belts encircling a larger circumference of the pulleys. In addition to this beneficial result an improved differential effect is produced when turning corners owing to the belt on the wheel unwinding itself on its driving pulley and thus becoming slack and loosing its grip whereby its road wheel can adjust itself to the different curve which it requires to traverse relatively to the other wheel.

It will be obvious that various modifications may be made without departing from the scope of the invention, for example the countershaft mechanism may be used in conjunction with transmission means other than crossed belts although for sake of convenience it has been illustrated therewith.

What I claim and desire to secure by Letters Patent of the United States is:—

1. In a motor vehicle, the combination of leaf springs, supports for stub-axles held between the ends of the springs one on each side of the vehicle, a pulley on each rear road wheel arranged substantially in the same plane as the hinge joint between the stub-axle supports and the spring ends, a laterally arranged countershaft, a pulley on each end of said countershaft, belts connecting the pulleys on the countershaft and the rear road wheel respectively, a friction wheel laterally adjustable on said countershaft, a friction disk on the motor and means for moving said friction wheel into or out of contact with said friction disk.

2. In a motor vehicle the combination of leaf springs, supports for stub axles held between the springs one on each side of the vehicle, a countershaft extending transversely of the vehicle, a friction wheel on said countershaft adapted to move longitudinally thereon and to engage the driving disk of the engine, a pulley on either end of said countershaft on the exterior of the vehicle frame, a pulley on each of said rear road wheels mounted in substantially the same plane at the hinge joint between the stub axle supports and the spring ends, and crossed belts on each side of the vehicle connecting said pulleys whereby the movement of the countershaft is transmitted to the rear road wheels, and a differential effect is produced by said belts and wheels when turning corners.

3. In a motor vehicle the combination of leaf springs, stub axles supported by said springs one on each side of the vehicle, an engine arranged with its crank shaft longitudinally of the vehicle, a friction disk driven by said engine, a countershaft arranged transversely of the vehicle, a friction wheel mounted on said countershaft the inner bearing of which is movable and the other two bearings being self alining, a lever operated by the driver for operating said inner bearing to throw the friction wheel into or out of engagement with the friction disk of the engine, said lever being arranged to put a certain amount of spring pressure on the countershaft disk in the one position yet hold it firmly out of gear in the other position, a pulley on each end of said countershaft on the exterior of the vehicle frame, a pulley on each of the rear road wheels and belts connecting the pulleys on the countershaft with the pulleys on said stub axles.

4. In a motor vehicle a pair of horizontal parallel leaf springs arranged transversely of the vehicle in the rear thereof and of different lengths, eyes in the ends of each spring, stub axles on either side of the vehicle, a vertical link member connected with each of said stub axles provided with eyes on opposite sides and at its ends, and hinge pins passing through the eyes in said link members and said spring connecting same together and preventing relative movement thereof, and a pulley on each rear road wheel mounted in substantially the same plane at the hinge pins.

In testimony whereof I affix my signature in presence of two witnesses.

THOMAS HEDGES.

Witnesses:
ROBERT WATERS,
T. SELBY WARDLE.